US012249453B2

(12) United States Patent
Nagai et al.

(10) Patent No.: US 12,249,453 B2
(45) Date of Patent: Mar. 11, 2025

(54) MULTILAYER COIL COMPONENT

(71) Applicant: TDK CORPORATION, Tokyo (JP)

(72) Inventors: Yusuke Nagai, Tokyo (JP); Kazuhiro Ebina, Tokyo (JP); Kouichi Kakuda, Tokyo (JP); Kunihiko Kawasaki, Tokyo (JP); Shinichi Kondo, Tokyo (JP); Yuya Ishima, Tokyo (JP); Masaki Takahashi, Tokyo (JP); Takahiro Sato, Tokyo (JP); Keito Yasuda, Tokyo (JP); Shingo Hattori, Tokyo (JP)

(73) Assignee: TDK CORPORATION, Tokyo (JP)

( * ) Notice: Subject to any disclaimer, the term of this patent is extended or adjusted under 35 U.S.C. 154(b) by 669 days.

(21) Appl. No.: 17/523,202

(22) Filed: Nov. 10, 2021

(65) Prior Publication Data

US 2022/0181073 A1 Jun. 9, 2022

(30) Foreign Application Priority Data

Dec. 9, 2020 (JP) ................................ 2020-204267

(51) Int. Cl.

*H01F 5/00* (2006.01)
*H01F 17/00* (2006.01)
*H01F 17/04* (2006.01)
*H01F 27/29* (2006.01)

(52) U.S. Cl.

CPC ....... *H01F 27/292* (2013.01); *H01F 17/0013* (2013.01); *H01F 17/04* (2013.01); *H01F 2017/048* (2013.01)

(58) Field of Classification Search

CPC ..................................................... H01F 27/292
USPC ......................................................... 336/200
See application file for complete search history.

(56) References Cited

U.S. PATENT DOCUMENTS

2013/0249662 A1* 9/2013 Tonoyama .......... H01F 17/0013 336/200
2017/0140864 A1* 5/2017 Arai ...................... H01F 1/0306
2018/0166199 A1 6/2018 Hachiya et al.
2020/0303117 A1 9/2020 Sato et al.
2021/0134506 A1 5/2021 Hachiya et al.

FOREIGN PATENT DOCUMENTS

CN 111724981 A 9/2020
JP 2018-098278 A 6/2018

* cited by examiner

*Primary Examiner* — Ronald Hinson
(74) *Attorney, Agent, or Firm* — Oliff PLC

(57) ABSTRACT

In a multilayer coil component, a coil is configured by electrically connecting coil conductors respectively provided in magnetic body layers constituting an element body and metal magnetic particles have a normal particle having an ellipsoidal shape and flat particles having an ellipsoidal shape flatter in a thickness direction than the normal particle. A plurality of the normal particles and at least one of the flat particles disposed such that a surface (reference surface) including a major axis direction orthogonal to the thickness direction and a minor axis direction is along the forming surface of the coil conductor in the magnetic body layer are arranged in the lamination direction of the magnetic body layers between the coil conductors.

5 Claims, 9 Drawing Sheets

MULTILAYER COIL COMPONENT

TECHNICAL FIELD

The present disclosure relates to a multilayer coil component.

BACKGROUND

The coil component described in Japanese Unexamined Patent Publication No. 2018-098278 is an example of existing multilayer coil components. The element body of this existing coil component contains a plurality of metal magnetic particles made of a soft magnetic body. Normal particles having a spherical shape and flat particles having a flat shape as compared with the normal particles are used as the metal magnetic particles.

SUMMARY

In multilayer coil components, it is important to improve the withstand voltage between conductors (coil conductors) constituting a coil. In order to improve the withstand voltage, it is effective to increase the number of the interfaces of the metal magnetic particles existing between the coil conductors. Meanwhile, when the number of the metal magnetic particles existing between the coil conductors becomes excessive, the interval between the metal magnetic particles decreases and an increase in stray capacitance becomes a problem.

The present disclosure has been made in order to solve the above problem, and an object of the present disclosure is to provide a multilayer coil component capable of improving the withstand voltage between coil conductors and suppressing an increase in stray capacitance at the same time.

A multilayer coil component according to one aspect of the present disclosure includes: an element body formed by laminating magnetic body layers containing a plurality of metal magnetic particles; a coil disposed in the element body; and an external electrode disposed on a surface of the element body and electrically connected to the coil, in which the coil is configured by electrically connecting coil conductors respectively provided in the magnetic body layers constituting the element body, the metal magnetic particles have a normal particle having an ellipsoidal shape and flat particles having an ellipsoidal shape flatter in a thickness direction than the normal particle, and a plurality of the normal particles and at least one of the flat particles disposed such that a surface including a major axis direction orthogonal to the thickness direction and a minor axis direction is along a forming surface of the coil conductor in the magnetic body layer are arranged in a lamination direction of the magnetic body layers between the coil conductors.

In this multilayer coil component, at least one flat particle and the plurality of normal particles are arranged in the lamination direction of the magnetic body layers between the coil conductors. The flat particle is disposed such that the surface including the major axis direction orthogonal to the thickness direction and the minor axis direction is along the forming surface of the coil conductor in the magnetic body layer. The flat particle is disposed in the slight gap between the coil conductors, and thus the number of the metal magnetic particles existing between the coil conductors can be increased as compared with a case where only the normal particles are used. As a result, the number of the interfaces of the metal magnetic particles existing between the coil conductors can be sufficiently ensured and the withstand voltage between the coil conductors can be improved. In a case where simply a larger number of flat particles are disposed for withstand voltage improvement, it is conceivable that the volume ratio of the metal magnetic particles between the coil conductors increases and an increase in stray capacitance occurs. On the other hand, in this multilayer coil component, the flat particle and the normal particles are mixed between the coil conductors. Since the normal particles thicker than the flat particle are disposed, the interval between the metal magnetic particles can be ensured appropriately. Accordingly, an increase in stray capacitance can be suppressed.

The flat particle may be disposed so as to straddle the plurality of normal particles in the major axis direction. In this case, a region where the normal particles and the flat particle are mixed and arranged in the lamination direction can be formed by a small number of flat particles.

The normal particle may be larger in volume than the flat particle. In this case, the flat particle can be disposed in the slighter gap between the coil conductors. Accordingly, the number of the interfaces of the metal magnetic particles existing between the coil conductors can be ensured more sufficiently and the withstand voltage between the coil conductors can be further improved.

The normal particles existing between the coil conductors may be larger in total volume than the flat particles existing between the coil conductors. In this case, the number of the flat particles that exist becoming excessive can be suppressed and the interval between the metal magnetic particles can be kept appropriate. Accordingly, an increase in stray capacitance can be suppressed more reliably.

The flat particle may include a needle-shaped particle whose length in the minor axis direction is smaller than a length of the normal particle in the thickness direction. By the needle-shaped particle being included in the flat particle, the interval between the metal magnetic particles can be kept more appropriate. Accordingly, an increase in stray capacitance can be suppressed more reliably.

A resin-filled part may exist in at least a part of a space between the plurality of metal magnetic particles in the element body. In this case, the strength of the element body can be sufficiently enhanced by the resin.

DETAILED DESCRIPTION

Hereinafter, a preferred embodiment of the multilayer coil component according to one aspect of the present disclosure will be described in detail with reference to the drawings.

Figure 1:
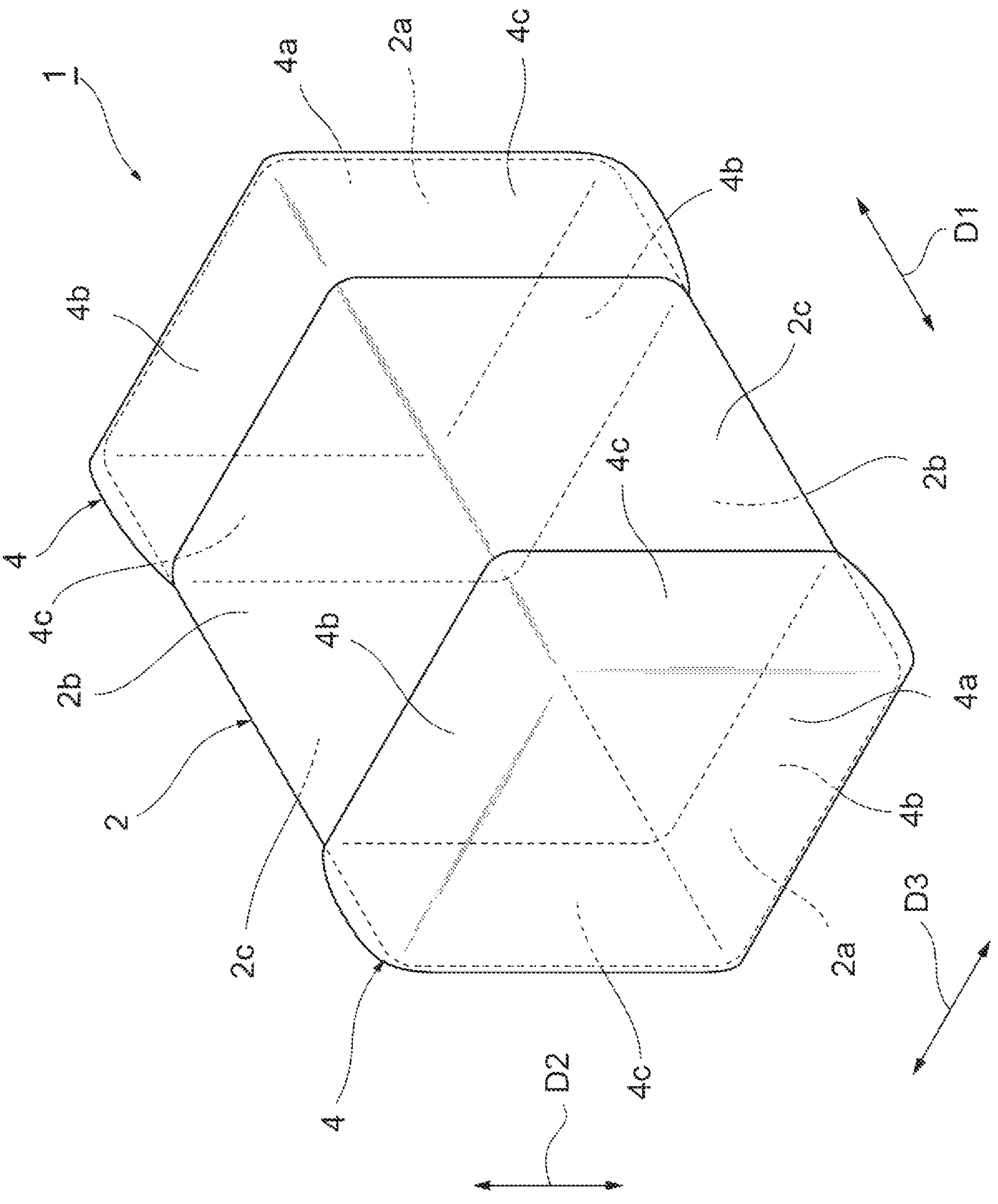
FIG. 1 is a perspective view illustrating an embodiment of a multilayer coil component.
Figure 2:
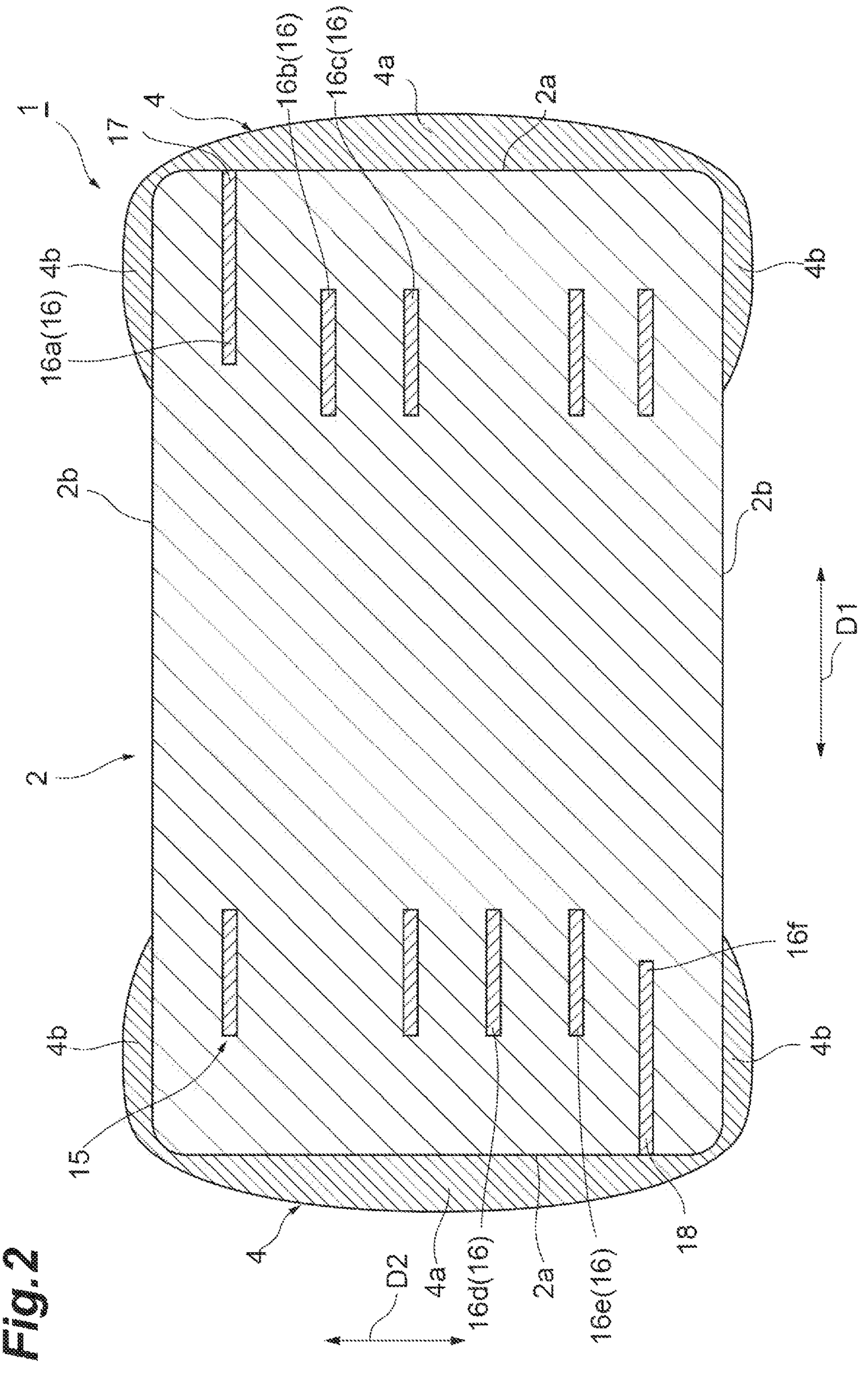
FIG. 2 is a diagram illustrating a cross-sectional configuration of the multilayer coil component illustrated in FIG. 1.
Figure 3:
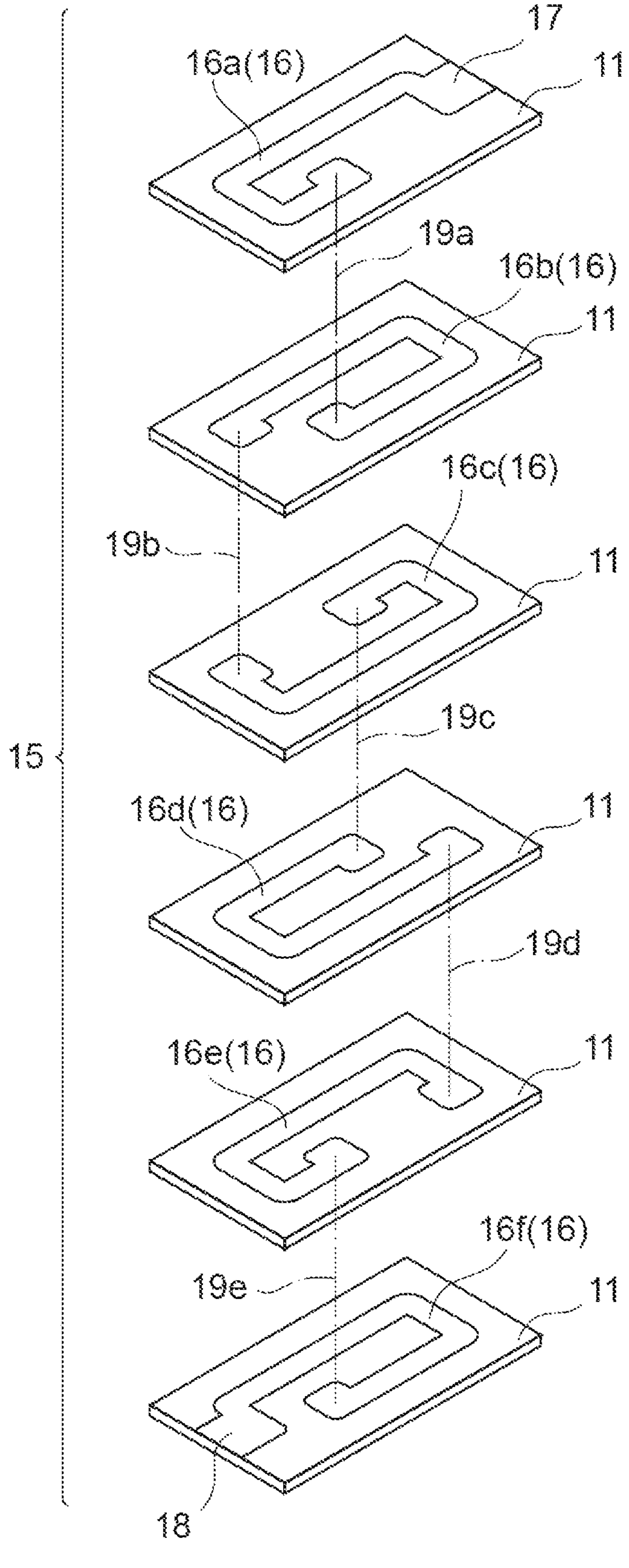
FIG. 3 is a perspective view illustrating the configuration of a coil.

The configuration of a multilayer coil component 1 according to the present embodiment will be described with reference to FIGS. 1 to 3. FIG. 1 is a perspective view illustrating an embodiment of the multilayer coil component. FIG. 2 is a diagram illustrating a cross-sectional configuration of the multilayer coil component illustrated in FIG. 1. FIG. 3 is a perspective view illustrating the configuration of a coil.

As illustrated in FIG. 1, the multilayer coil component 1 includes an element body 2 having a rectangular parallelepiped shape and a pair of external electrodes 4 and 4. The pair of external electrodes 4 and 4 are respectively disposed in both end portions of the element body 2 and are separated from each other. The rectangular parallelepiped shape includes a rectangular parallelepiped shape in which the corner and ridge portions are chamfered and a rectangular parallelepiped shape in which the corner and ridge portions are rounded. The multilayer coil component 1 can be applied to, for example, a bead inductor or a power inductor.

The rectangular parallelepiped element body 2 has a pair of end surfaces 2*a* and 2*a* facing each other, a pair of main surfaces 2*b* and 2*b* facing each other, and a pair of side surfaces 2*c* and 2*c* facing each other. The end surfaces 2*a* and 2*a* are positioned so as to be adjacent to the pair of main surfaces 2*b* and 2*b*. In addition, the end surfaces 2*a* and 2*a* are positioned so as to be adjacent to the pair of side surfaces 2*c* and 2*c*. One of the main surfaces 2*b* (bottom surface in FIG. 1) can be a mounting surface. The mounting surface faces another electronic device when the multilayer coil component 1 is mounted on the electronic device (such as a circuit board and an electronic component).

In the present embodiment, the facing direction of the pair of end surfaces 2*a* and 2*a* (first direction D1) is the length direction of the element body 2. The facing direction of the pair of main surfaces 2*b* and 2*b* (second direction D2) is the height direction of the element body 2. The facing direction of the pair of side surfaces 2*c* and 2*c* (third direction D3) is the width direction of the element body 2. The first direction D1, the second direction D2, and the third direction D3 are orthogonal to each other.

The length of the element body 2 in the first direction D1 is larger than the lengths of the element body 2 in the second direction D2 and the third direction D3. The length of the element body 2 in the second direction D2 is equivalent to the length of the element body 2 in the third direction D3. In other words, in the present embodiment, the pair of end surfaces 2*a* and 2*a* have a square shape and the pair of main surfaces 2*b* and 2*b* and the pair of side surfaces 2*c* and 2*c* have a rectangular shape.

The length of the element body 2 in the first direction D1 may be equivalent to the lengths of the element body 2 in the second direction D2 and the third direction D3. The length of the element body 2 in the second direction D2 may be different from the length of the element body 2 in the third direction D3. The equivalence includes, in addition to equality, a slight difference or a manufacturing error within a preset range. For example, a plurality of values may be regarded as equivalent insofar as the plurality of values are included in the range of 95% to 105% of the average value of the plurality of values.

The pair of end surfaces 2*a* and 2*a* extend in the second direction D2 so as to connect the pair of main surfaces 2*b* and 2*b*. The pair of end surfaces 2*a* and 2*a* also extend in the third direction D3 so as to connect the pair of side surfaces 2*c* and 2*c*. The pair of main surfaces 2*b* and 2*b* extend in the first direction D1 so as to connect the pair of end surfaces 2*a* and 2*a*. The pair of main surfaces 2*b* and 2*b* also extend in the third direction D3 so as to connect the pair of side surfaces 2*c* and 2*c*. The pair of side surfaces 2*c* and 2*c* extend in the first direction D1 so as to connect the pair of end surfaces 2*a* and 2*a*. The pair of side surfaces 2*c* and 2*c* also extend in the second direction D2 so as to connect the pair of main surfaces 2*b* and 2*b*.

The element body 2 is configured by laminating a plurality of magnetic body layers 11 (see FIG. 3). The magnetic body layers 11 are laminated in the facing direction of the main surfaces 2*b* and 2*b*. In other words, the lamination direction of the magnetic body layers 11 coincides with the facing direction of the main surfaces 2*b* and 2*b* (hereinafter, the facing direction of the main surfaces 2*b* and 2*b* will be referred to as "lamination direction"). Each magnetic body layer 11 has a substantially rectangular shape. In the actual element body 2, the magnetic body layers 11 are integrated to the extent that the boundaries between the layers cannot be visually recognized.

As illustrated in FIGS. 2 and 3, a coil 15 is disposed in the element body 2. The coil 15 includes a plurality of coil conductors 16 (16*a* to 16*f*). The plurality of coil conductors 16*a* to 16*f* contain a conductive material (such as Ag or Pd). The plurality of coil conductors 16*a* to 16*f* are configured as sintered bodies of conductive paste containing a conductive material (such as Ag powder or Pd powder).

The coil conductor 16*a* includes a connecting conductor 17. The connecting conductor 17 is disposed on one end surface 2*a* side of the element body 2 and has an end portion exposed to one end surface 2*a*. The end portion of the connecting conductor 17 is exposed at a position close to one main surface 2*b* on one end surface 2*a* and is connected to one external electrode 4. In other words, the coil 15 is electrically connected to one external electrode 4 via the connecting conductor 17. In the present embodiment, the conductor pattern of the coil conductor 16*a* and the conductor pattern of the connecting conductor 17 are formed integrally and continuously.

The plurality of coil conductors 16*a* to 16*f* are formed in the lamination direction of the magnetic body layers 11 in the element body 2. The plurality of coil conductors 16*a* to 16*f* are arranged in the order of the coil conductor 16*a*, the coil conductor 16*b*, the coil conductor 16*c*, the coil conductor 16*d*, the coil conductor 16*e*, and the coil conductor 16*f*. In the present embodiment, the coil 15 is configured by the part of the coil conductor 16*a* other than the connecting conductor 17, the plurality of coil conductors 16*b* to 16*d*, and the part of the coil conductor 16*f* other than the connecting conductor 18.

The end portions of the coil conductors 16*a* to 16*f* are connected to each other by through hole conductors 19*a* to 19*e*. The coil conductors 16*a* to 16*f* are electrically connected to each other by the through hole conductors 19*a* to 19*e*. The coil 15 is configured by electrically connecting the plurality of coil conductors 16*a* to 16*f*. Each of the through hole conductors 19*a* to 19*e* contains a conductive material (such as Ag or Pd). Each of the through hole conductors 19*a* to 19*e* is configured as a sintered body of conductive paste containing a conductive material (such as Ag powder or Pd powder) as in the case of the plurality of coil conductors 16*a* to 16*f*.

The external electrode 4 is disposed so as to cover the end portion of the element body 2 on the end surface 2*a* side. As illustrated in FIG. 1, the external electrode 4 has an electrode part 4*a* covering the end surface 2*a*, electrode parts 4*b* and 4*b* overhanging the pair of main surfaces 2*b* and 2*b*, and electrode parts 4*c* and 4*c* overhanging the pair of side surfaces 2*c* and 2*c*. In other words, the external electrode 4 is formed of the five surfaces formed by the electrode parts 4*a*, 4*b*, and 4*c*.

The electrode part 4*a* is disposed so as to cover the entire end portions of the connecting conductors 17 and 18 exposed on the end surface 2*a*, and the connecting conductors 17 and 18 are directly connected to the external electrode 4. In other words, the connecting conductors 17 and 18 connect the end portion of the coil 15 and the electrode part 4*a*. As a result, the coil 15 is electrically connected to the external electrode 4.

The electrode parts 4*a*, 4*b*, and 4*c* adjacent to each other are continuous and electrically connected in the ridge portion of the element body 2. The electrode part 4*a* and the electrode part 4*b* are connected in the ridge portion between the end surface 2*a* and the main surface 2*b*. The electrode part 4*a* and the electrode part 4*c* are connected in the ridge portion between the end surface 2*a* and the side surface 2*c*.

The external electrode 4 is configured to contain a conductive material. The conductive material is, for example, Ag or Pd. The external electrode 4 is a baking electrode and is configured as a sintered body of conductive paste. The conductive paste contains conductive metal powder and glass frit. The conductive metal powder is, for example, Ag powder or Pd powder. A plating layer is formed on the surface of the external electrode 4. The plating layer is formed by, for example, electroplating. The electroplating is, for example, electric Ni plating or electric Sn plating.

Next, the configuration of the element body 2 described above will be described in more detail.

Figure 4:
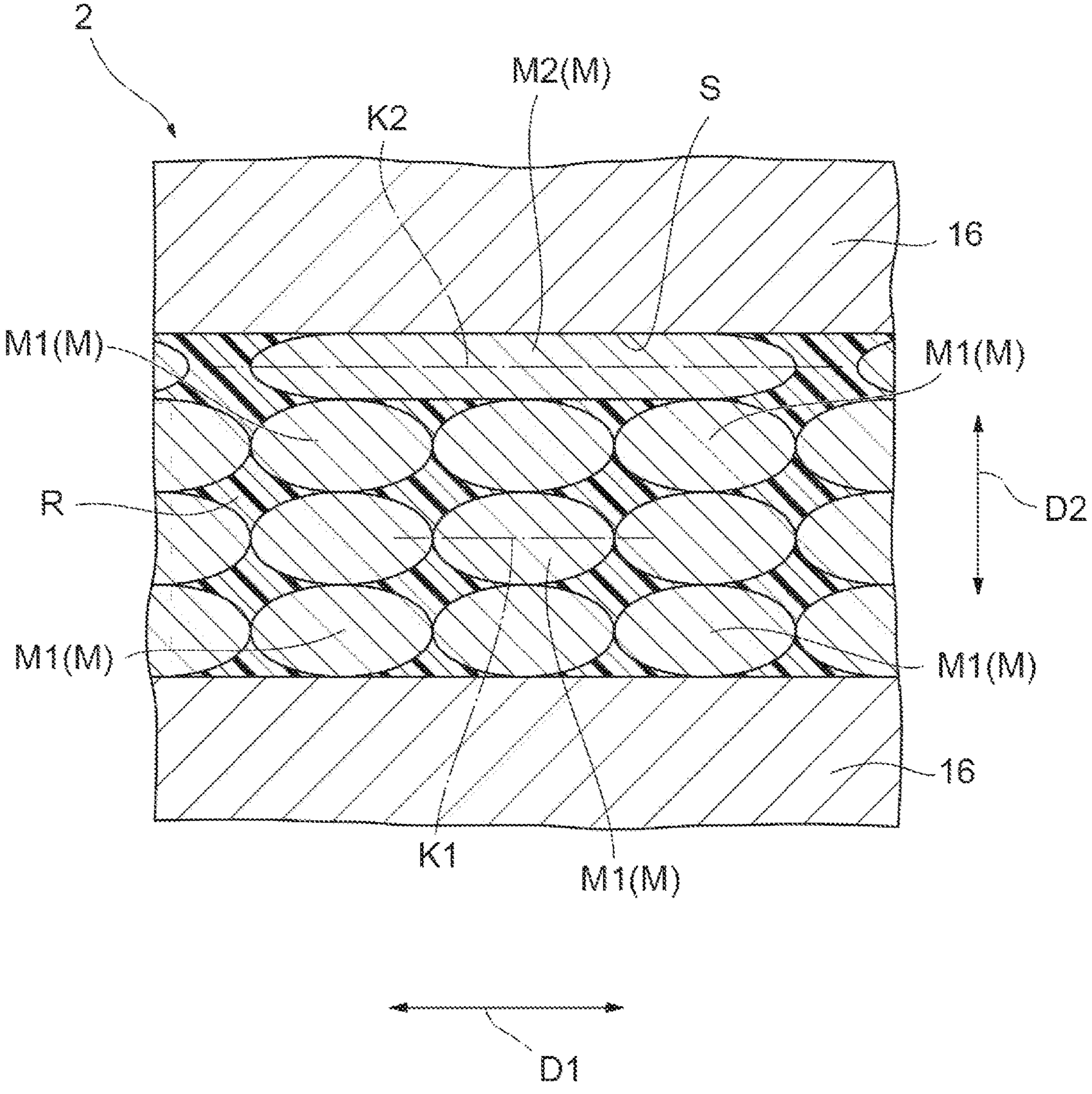
FIG. 4 is an enlarged schematic view illustrating a cross-sectional configuration of the space between coil conductors in an element body.

FIG. 4 is an enlarged schematic view illustrating a cross-sectional configuration of the space between the coil conductors in the element body. As illustrated in the drawing, the element body 2 contains a plurality of metal magnetic particles M. The metal magnetic particles M are made of, for example, a soft magnetic alloy. The soft magnetic alloy is, for example, a Fe—Si-based alloy. In a case where the soft magnetic alloy is the Fe—Si-based alloy, the soft magnetic alloy may contain P. The soft magnetic alloy may be, for example, a Fe—Ni—Si-M-based alloy. "M" contains one or more elements selected from Co, Cr, Mn, P, Ti, Zr, Hf, Nb, Ta, Mo, Mg, Ca, Sr, Ba, Zn, B, Al, and rare earth elements.

In the element body 2, the metal magnetic particles M and M are bonded to each other. The metal magnetic particles M and M are bonded to each other by, for example, the oxide films formed on the surfaces of the metal magnetic particles M being bonded to each other. As illustrated in FIG. 4, the element body 2 includes a part filled with a resin R. The resin R exists in at least a part of the space between the plurality of metal magnetic particles M and M. The resin R is a resin that has electrical insulation. For example, a silicone resin, a phenol resin, an acrylic resin, an epoxy resin, or the like is used as the resin R. A void part that is not filled with the resin R may exist between the plurality of metal magnetic particles M and M.

More specifically, the metal magnetic particles M are configured to include normal particles M1 having an ellipsoidal shape and flat particles M2 having an ellipsoidal shape (disk shape) flatter in the thickness direction than the normal particles. The thickness direction is a direction specified for convenience. Here, in a state of being disposed in the element body 2, the lamination direction of the magnetic body layers 11, that is, the direction in which the coil conductors 16 and 16 are connected to each other is the thickness direction of the normal particles M1 and the flat particles M2. The normal particle M1 has a surface including a major axis direction orthogonal to the thickness direction and a minor axis direction (hereinafter, referred to as a reference surface K1). Likewise, the flat particle M2 has a surface including a major axis direction orthogonal to the thickness direction and a minor axis direction (hereinafter, referred to as a reference surface K2). Here, a particle whose length in the major axis direction orthogonal to the thickness direction is three times or less its length in the thickness direction is the normal particle M1 and a particle whose length in the major axis direction orthogonal to the thickness direction exceeds three times its length in the thickness direction is the flat particle M2.

Figure 5A:
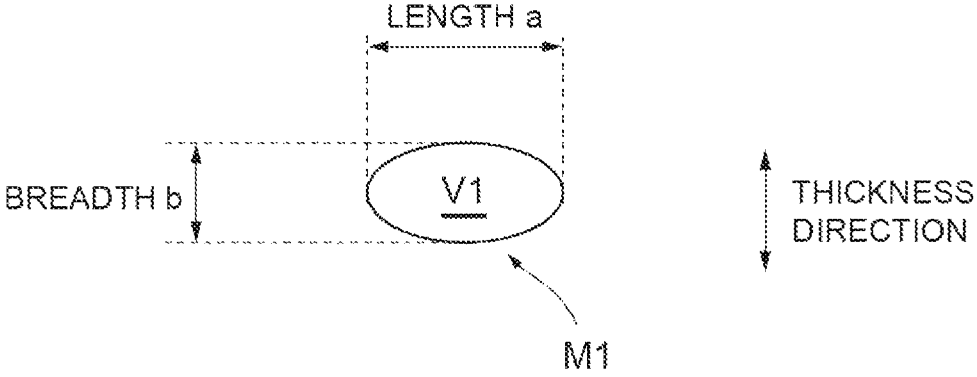
FIG. 5A is a schematic view illustrating the shape of a normal particle.
Figure 5B:
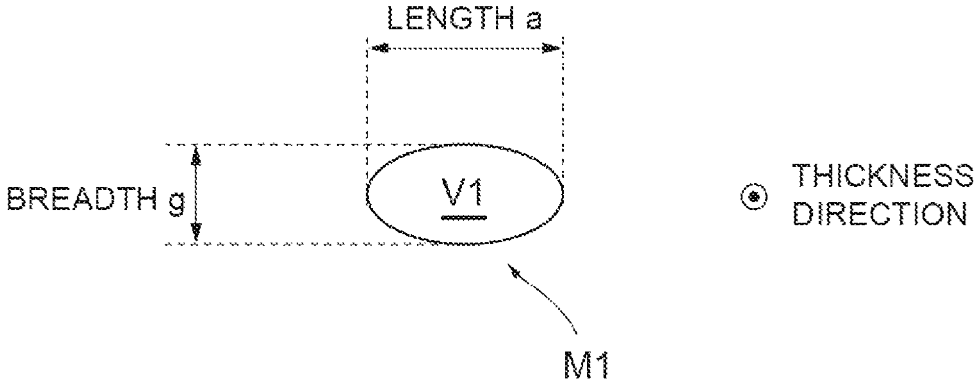
FIG. 5B is a schematic view illustrating the shape of a normal particle.
Figure 6A:
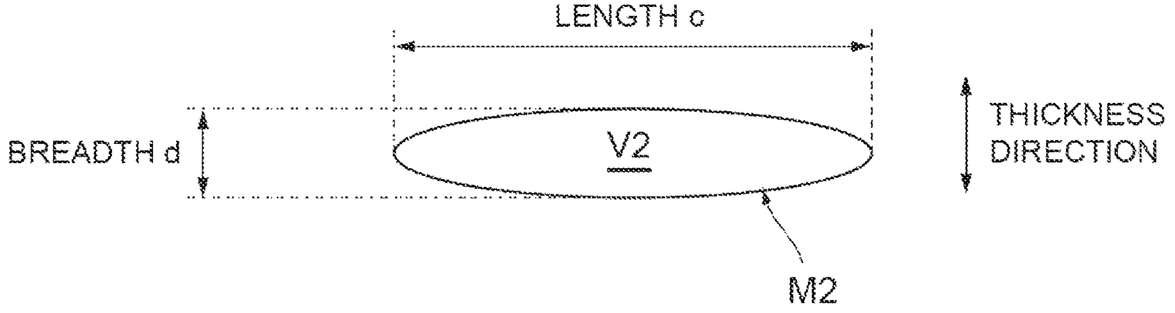
FIG. 6A is a schematic view illustrating the shape of a flat particle.
Figure 6B:
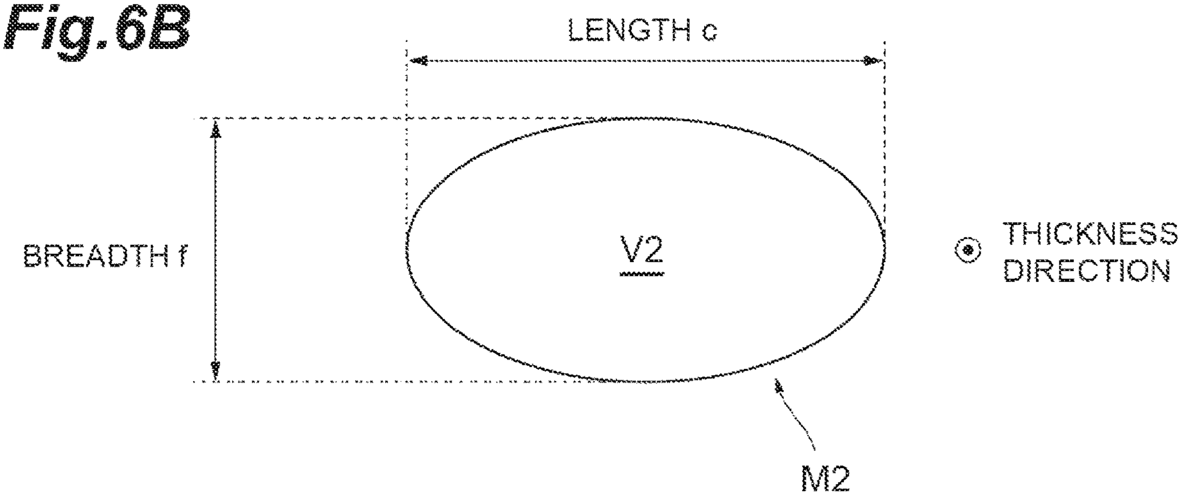
FIG. 6B is a schematic view illustrating the shape of a flat particle.

The normal particles M1 and the flat particles M2 have a length and a breadth when viewed from the direction orthogonal to the thickness direction and the thickness direction, respectively. As illustrated in FIG. 5A, the length of the normal particle M1 is a and the breadth of the normal particle M1 is b in a case where the normal particle M1 is viewed from the direction orthogonal to the thickness direction. As illustrated in FIG. 5B, the breadth of the normal particle M1 is g in a case where the normal particle M1 is viewed from the direction orthogonal to the thickness direction. The volume of the normal particle M1 is V1. As illustrated in FIG. 6A, the length of the flat particle M2 is c and the breadth of the flat particle M2 is d in a case where the flat particle M2 is viewed from the direction orthogonal to the thickness direction. As illustrated in FIG. 6B, the breadth of the flat particle M2 is f in a case where the flat particle M2 is viewed from the thickness direction. The volume of the flat particle M2 is V2.

In the relationship between the normal particle M1 and the flat particle M2, the length a of the normal particle M1 is smaller than the length c of the flat particle M2 and the breadth b of the normal particle M1 is larger than the breadth d of the flat particle M2. The breadth g of the normal particle M1 is smaller than the breadth f of the flat particle M2. The volume V1 of the normal particle M1 is larger than the volume V2 of the flat particle M2. The volume V1 of the normal particle M1 may be larger than twice the volume V2 of the flat particle M2.

The breadths, lengths, and volumes of the normal particle M1 and the flat particle M2 can be measured using, for example, a scanning electron microscope (SEM). In this case, the diameter and breadth of the particle are measured by acquiring a cross-sectional photograph of the space between the coil conductors 16 and 16 in the element body 2 using the SEM and performing elliptical approximation of the particle cross section. The volumes V1 and V2 are calculated based on the average values of the particle diameters of the normal particles M1 and the flat particles M2 existing in each cross section orthogonal to the first direction D1, the second direction D2, and the third direction D3 in a predetermined region between the coil conductors 16 and 16, respectively.

As illustrated in FIG. 4, the plurality of normal particles M1 and at least one flat particle M2 are disposed between the coil conductors 16 and 16. The disposition of the normal particles M1 and the flat particle M2 is schematically illustrated in FIG. 4. In the example of the drawing, three normal particles M1 and one flat particle M2 are arranged in the lamination direction of the magnetic body layers 11 (direction in which the coil conductors 16 and 16 are connected to each other). The flat particle M2 is in contact with one of the coil conductors 16 and 16. The three normal particles M1 are connected in a row in the lamination direction of the magnetic body layers 11 and are in contact with the flat particle M2 and the other of the coil conductors 16 and 16.

In the example of FIG. 4, both the normal particles M1 and the flat particle M2 are disposed such that the thickness direction is along the lamination direction of the magnetic body layers 11. In the normal particle M1, the length a is along one axis in the in-plane direction of the magnetic body layer 11 (here, the first direction D1), the breadth b is along the direction in which the coil conductors 16 and 16 are connected to each other, and the breadth g is along the other axis in the in-plane direction of the magnetic body layer 11 (here, the third direction D3). In the flat particle M2, the length c is along one axis in the in-plane direction of the magnetic body layer 11 (here, the first direction D1), the breadth d is along the direction in which the coil conductors 16 and 16 are connected to each other, and the breadth f is along the other axis in the in-plane direction of the magnetic body layer 11 (here, the third direction D3).

The flat particle M2 is disposed such that the reference surface K2 including the major axis direction orthogonal to the thickness direction and the minor axis direction is along a forming surface S of the coil conductor 16 in the magnetic body layer 11. The forming surface S of the coil conductor 16 is the surface where the coil conductor 16 is formed in the magnetic body layer 11 (see FIG. 3) and has the first direction D1 and the third direction D3 as in-plane directions. The reference surface K2 of the flat particle M2 is parallel or substantially parallel to the forming surface S of the coil conductor 16.

In a case where the reference surface K2 of the flat particle M2 is substantially parallel to the forming surface S of the coil conductor 16, the reference surface K2 of the flat particle M2 may be tilted with respect to the forming surface S of the coil conductor 16 within a range in which, for example, the distance between the lowest and highest points of the flat particle M2 in the direction in which the coil conductors 16 and 16 are connected to each other does not exceed the breadth b of the normal particle M1. The posture of the flat particle M2 is displaced in accordance with the flow of a paint when, for example, the paint containing the metal magnetic particles M is applied to a support body during the formation of the magnetic body layer 11. As a result, the reference surface K2 of the flat particle M2 becomes parallel or substantially parallel to the forming surface S of the coil conductor 16. It should be noted that the normal particle M1 in the present embodiment is also disposed such that the reference surface K1 including the major axis direction orthogonal to the thickness direction and the minor axis direction is along the forming surface S of the coil conductor 16 in the magnetic body layer 11.

The flat particle M2 is disposed so as to straddle the plurality of normal particles M1 in the major axis direction. In the present embodiment, the length c of the flat particle M2 is larger than the length a of the normal particle M1 and the flat particle M2 is disposed across the three normal particles M1 adjacent in the first direction D1. In addition, in the present embodiment, the breadth f of the flat particle M2 is larger than the breadth of the normal particle M1 and the flat particle M2 is disposed so as to straddle the plurality of normal particles M1 also in the third direction D3.

The total volume of the normal particles M1 existing between the coil conductors 16 and 16 is larger than the total volume of the flat particles M2 existing between the coil conductors 16 and 16. The total volume of the normal particles M1 existing between the coil conductors 16 and 16 may be larger than twice the total volume of the flat particles M2. The total volume of the normal particles M1 and the total volume of the flat particles M2 can be calculated by, for example, enlarging the cross section of the element body 2 by a factor of 3000 with a scanning electron microscope (SEM) and multiplying the volume V1 of the normal particle M1 and the volume V2 of the flat particle M2 by the numbers of the normal particles M1 and the flat particles M2 in the cross section, respectively.

As described above, in the multilayer coil component 1, at least one flat particle M2 and the plurality of normal particles M1 are arranged in the lamination direction of the magnetic body layers 11 between the coil conductors 16 and 16. The flat particle M2 is disposed such that the reference surface K2 including the major axis direction orthogonal to the thickness direction and the minor axis direction is along the forming surface S of the coil conductor 16 in the magnetic body layer 11. The flat particle M2 is disposed in the slight gap between the coil conductors 16 and 16, and thus the number of the metal magnetic particles M existing between the coil conductors 16 and 16 can be increased as compared with a case where only the normal particles M1 are used. As a result, the number of the interfaces of the metal magnetic particles M existing between the coil conductors 16 and 16 can be sufficiently ensured and the withstand voltage between the coil conductors 16 and 16 can be improved. In a case where simply a larger number of flat particles M2 are disposed for withstand voltage improvement, it is conceivable that the volume ratio of the metal magnetic particles M between the coil conductors 16 and 16 increases and an increase in stray capacitance occurs. On the other hand, in the multilayer coil component 1, the flat particle M2 and the normal particles M1 are mixed between the coil conductors 16 and 16. Since the normal particles M1 larger in thickness-direction diameter than the flat particle M2 are disposed, the interval between the metal magnetic particles M and M can be ensured appropriately. Accordingly, an increase in stray capacitance can be suppressed.

In the present embodiment, the flat particle M2 is disposed so as to straddle the plurality of normal particles M1 in the major axis direction. With such a configuration, a region where the normal particles M1 and the flat particle M2 are mixed and arranged in the lamination direction of the magnetic body layers 11 can be formed by a small number of flat particles M2. Since the number of the flat particles M2 that exist does not become excessive, the interval between the metal magnetic particles M and M can be ensured more appropriately. Accordingly, an increase in stray capacitance can be suppressed more reliably.

In the present embodiment, the volume V1 of the normal particle M1 is larger than the volume V2 of the flat particle M2. As a result, the flat particle M2 can be disposed in the slighter gap between the coil conductors 16 and 16. Accordingly, the number of the interfaces of the metal magnetic particles M existing between the coil conductors 16 and 16 can be ensured more sufficiently and the withstand voltage between the coil conductors 16 and 16 can be further improved.

In the present embodiment, the total volume of the normal particles M1 existing between the coil conductors 16 and 16 is larger than the total volume of the flat particles M2 existing between the coil conductors 16 and 16. As a result, the number of the flat particles M2 that exist becoming excessive can be suppressed and the interval between the metal magnetic particles M and M can be kept appropriate. Accordingly, an increase in stray capacitance can be suppressed more reliably.

In the present embodiment, a part V filled with the resin R exists in at least a part of the space between the plurality of metal magnetic particles M and M in the element body 2. As a result of the filling with the resin R, the strength of the element body 2 can be sufficiently enhanced.

The present disclosure is not limited to the embodiment described above.

Figure 7A:
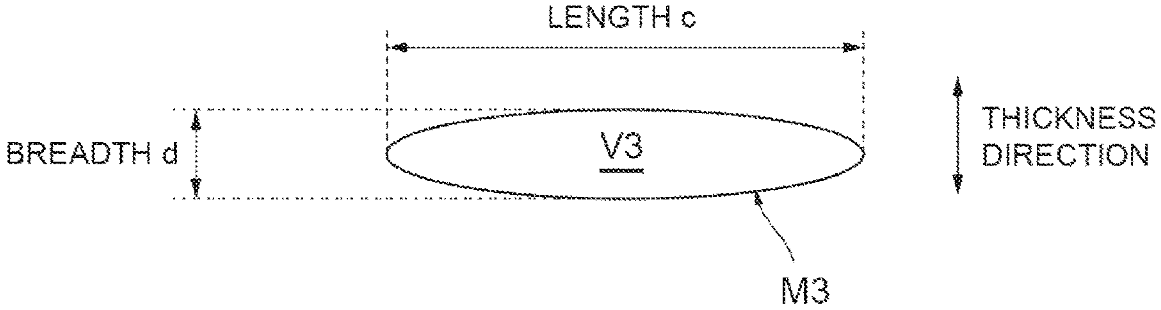
FIG. 7A is a schematic view illustrating the shape of a needle-shaped particle.
Figure 7B:
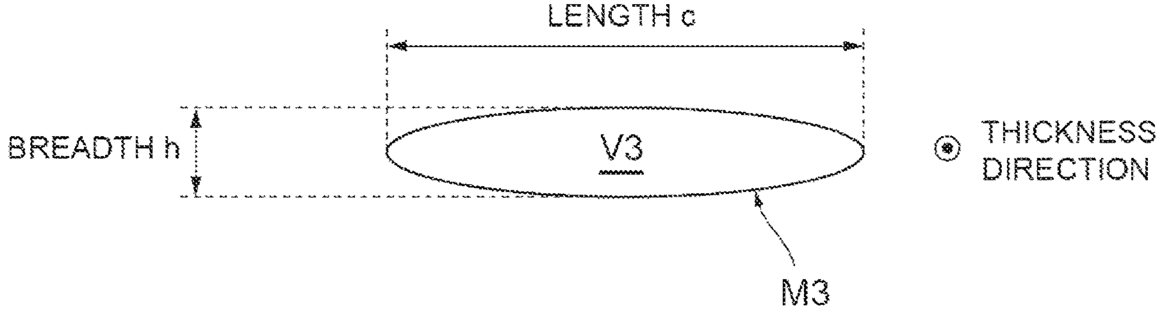
FIG. 7B is a schematic view illustrating the shape of a needle-shaped particle.

As illustrated in FIG. 7A and FIG. 7B, the flat particle M2 may include a needle-shaped particle M3 whose length in the minor axis direction on the reference surface K2 is smaller than the thickness-direction length of the normal particle M1. In other words, not only the disk-shaped flat particle M2 as illustrated in FIGS. 6A and 6B but also the needle-shaped particle M3 whose length in the minor axis direction on the reference surface K2 is smaller than the thickness-direction length of the normal particle M1 can be used as the flat particle. By the needle-shaped particle M3 being included in the flat particle M2, the interval between the metal magnetic particles M and M can be kept more appropriate. Accordingly, an increase in stray capacitance can be suppressed more reliably.

As illustrated in FIG. 7A, in the needle-shaped particle M3, the length c and the breadth d as viewed from the direction orthogonal to the thickness direction are equal to those of the flat particle M2. On the other hand, as illustrated in FIG. 7B, in the needle-shaped particle M3, a breadth h as viewed from the thickness direction is smaller than the breadth f of the flat particle M2. The breadth h of the needle-shaped particle M3 may be equal to the breadth d of the flat particle M2. The breadth h of the needle-shaped particle M3 may be smaller than the breadth g of the normal particle M1. Since the breadth h is smaller than the breadth f, a volume V3 of the needle-shaped particle M3 is smaller than the volume V2 of the flat particle M2. The volume V3 of the needle-shaped particle M3 may be smaller than the volume V1 of the normal particle M1. In a case where the needle-shaped particle M3 is used, the needle-shaped particle M3 that exists may be larger in number than the flat particle M2 that exists. Every flat particle may be the needle-shaped particle M3.

Figure 8:
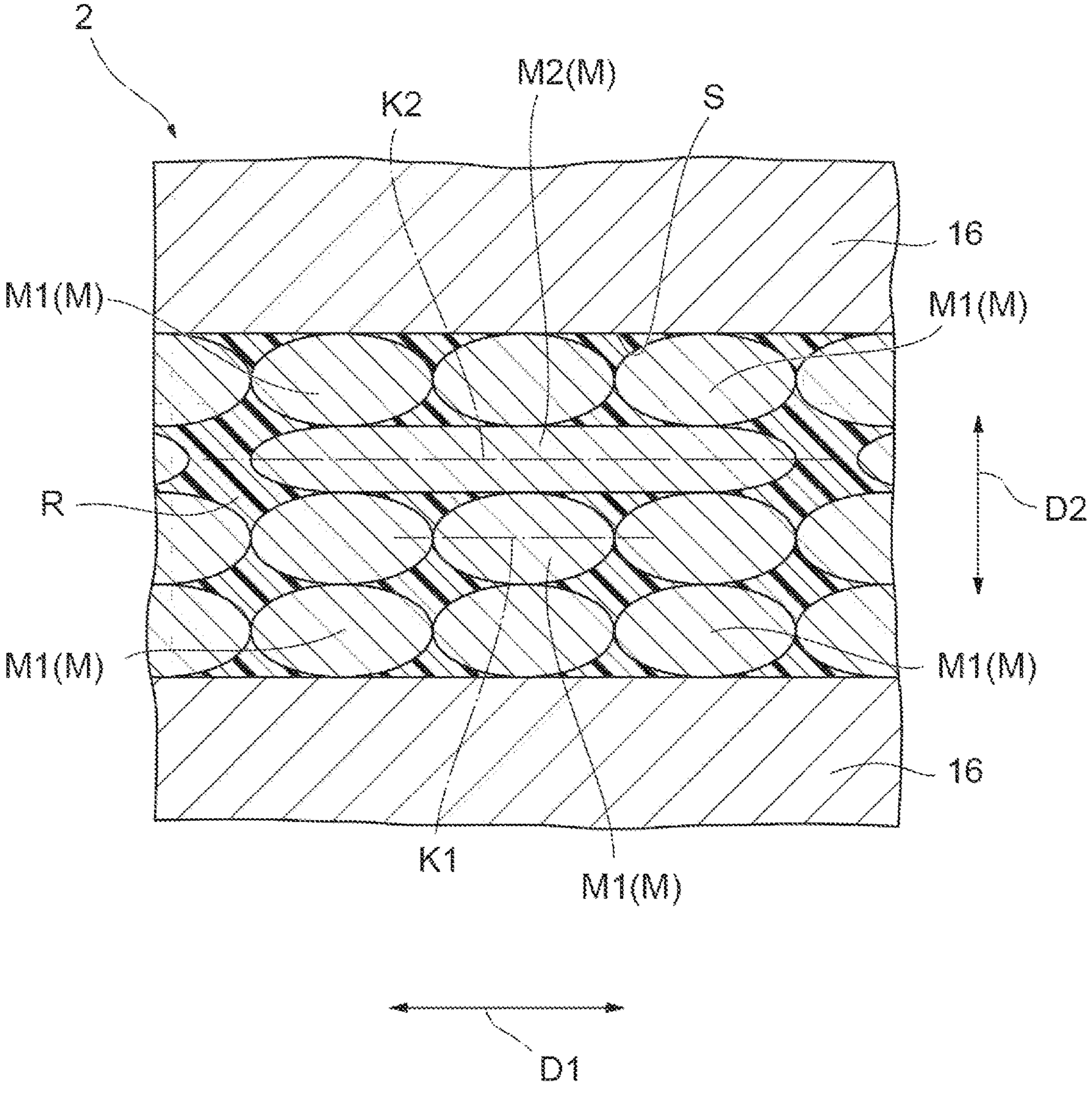
FIG. 8 is an enlarged schematic view illustrating another example of the cross-sectional configuration of the space between the coil conductors in the element body.

In the embodiment described above, the flat particle M2 is in contact with one of the coil conductors 16 and 16. As illustrated in FIG. 8, in an alternative aspect, the flat particle M2 may not be in contact with any of the coil conductors 16 and 16. In the example of FIG. 8, the flat particle M2 is positioned between the normal particles M1 and M1 arranged in the direction in which the coil conductors 16 and 16 are connected to each other and the normal particles M1 are in contact with the coil conductors 16 and 16.

Figure 9:
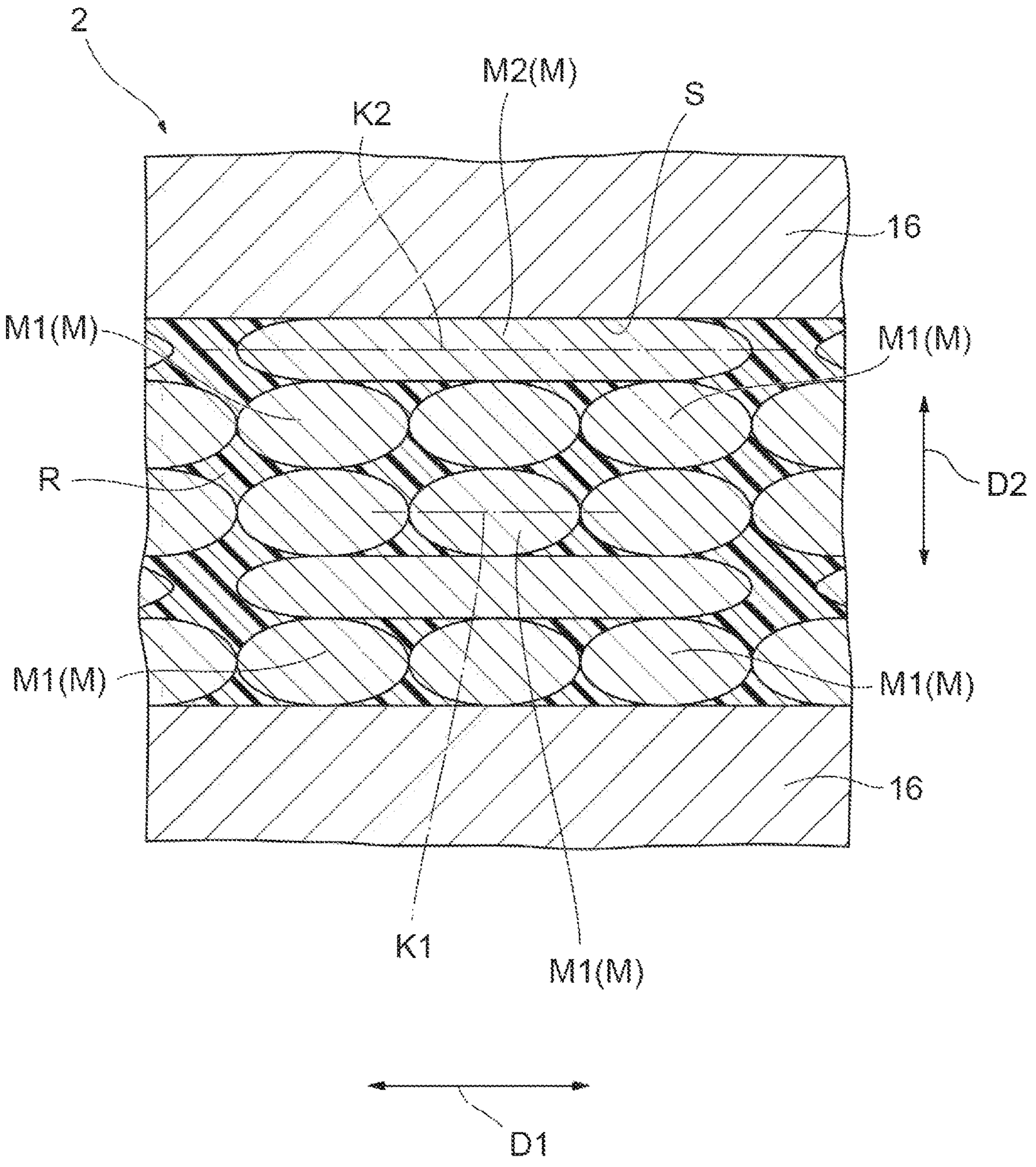
FIG. 9 is an enlarged schematic view illustrating yet another example of the cross-sectional configuration of the space between the coil conductors in the element body.

Although one flat particle M2 is disposed in the direction in which the coil conductors 16 and 16 are connected to each other in the embodiment described above, a plurality of the flat particles M2 may be disposed in the direction in which the coil conductors 16 and 16 are connected to each other as illustrated in FIG. 9. In the example of FIG. 9, two flat particles M2 are disposed in the direction in which the coil conductors 16 and 16 are connected to each other. One flat particle M2 is in contact with one of the coil conductors 16 and 16, and one flat particle M2 is positioned between the normal particles M1 and M1 arranged in the direction in which the coil conductors 16 and 16 are connected to each other.

Also in the aspects of FIGS. 8 and 9, the flat particle M2 is disposed such that the reference surface K2 including the major axis direction orthogonal to the thickness direction and the minor axis direction is along the forming surface S of the coil conductor 16 in the magnetic body layer 11. Accordingly, as in the case of the embodiment described above, the withstand voltage between the coil conductors 16 and 16 can be improved and an increase in stray capacitance can be suppressed at the same time.

What is claimed is:

1. A multilayer coil component comprising:

an element body formed by laminating magnetic body layers containing a plurality of metal magnetic particles;

a coil disposed in the element body; and an external electrode disposed on a surface of the element body and electrically connected to the coil, wherein the coil is configured by electrically connecting coil conductors respectively provided in the magnetic body layers constituting the element body, the metal magnetic particles have a normal particle having an ellipsoidal shape and flat particles having an ellipsoidal shape flatter in a thickness direction than the normal particle, a plurality of the normal particles and at least one of the flat particles disposed such that a surface including a major axis direction orthogonal to the thickness direction and a minor axis direction is along a forming surface of the coil conductor in the magnetic body layer are arranged in a lamination direction of the magnetic body layers between the coil conductors, and the flat particle is disposed so as to straddle the plurality of normal particles in the major axis direction.

2. The multilayer coil component according to claim 1, wherein the normal particle is larger in volume than the flat particle.

3. The multilayer coil component according to claim 1, wherein the normal particles existing between the coil conductors are larger in total volume than the flat particles existing between the coil conductors.

4. The multilayer coil component according to claim 1, wherein the flat particle includes a needle-shaped particle whose length in the minor axis direction is smaller than a length of the normal particle in the thickness direction.

5. The multilayer coil component according to claim 1, wherein a resin-filled part exists in at least a part of a space between the plurality of metal magnetic particles in the element body.

* * * * *